Fig. 11(a) RIGIDITY MATRIX OF ARCUATE BEAM $$\begin{Bmatrix} P_1 \\ Q_1 \\ M_1/R \\ P_2 \\ Q_2 \\ M_2/R \end{Bmatrix} = \frac{EI}{R^3} \begin{bmatrix} 2105.7 & 861.58 & 111.42 & -2098.2 & 879.7 & -118.9 \\ 861.58 & 38245 & 56.732 & -879.7 & 3388 & -38.66 \\ 111.42 & 56.732 & 11.323 & -118.9 & 38.66 & -3.845 \\ -2098.2 & -879.7 & -118.90 & 2105.7 & -861.58 & 111.42 \\ 879.7 & 3388 & 38.66 & -861.58 & 38245 & -56.732 \\ -118.9 & -38.66 & -3.845 & 111.42 & -56.732 & 11.323 \end{bmatrix} \begin{Bmatrix} U_1 \\ V_1 \\ \theta_1 R \\ U_2 \\ V_2 \\ \theta_2 R \end{Bmatrix}$$

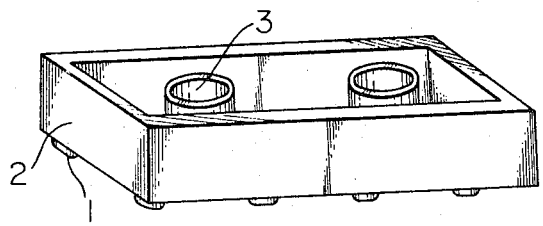
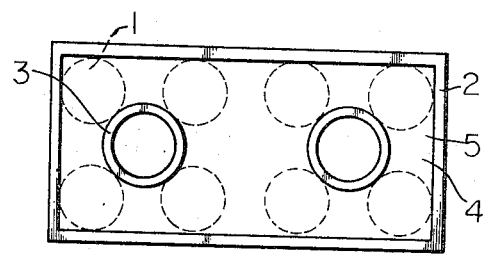
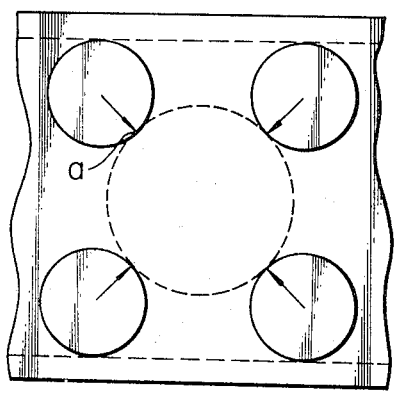
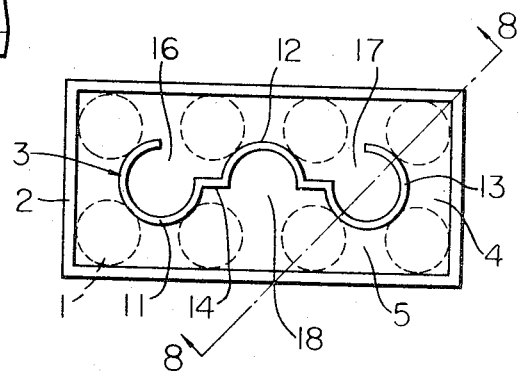
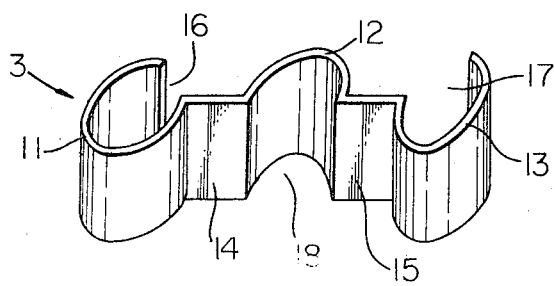
INVENTORS.
TAKASHI MATSUBAYASHI
HIROZO MATSUBAYASHI
BY Kurt Kelman
AGENT

Fig. 11(b) RIGIDITY MATRIX OF STRAIGHT BEAM

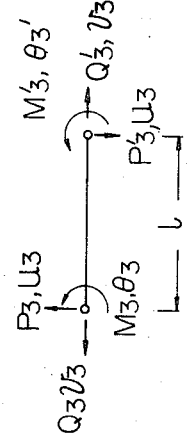

$R:L:t = 14:12:3.5$ $$\begin{Bmatrix} P_3 \\ Q_3 \\ M_3/R \\ P_3' \\ Q_3' \\ M_3'/R \end{Bmatrix} = \frac{EI}{R^3} \begin{bmatrix} 19.055 & 0 & 8.166 & 19.055 & 0 & 8.166 \\ 0 & 224 & 0 & 0 & 224 & 0 \\ 8.166 & 0 & 4.66 & 8.166 & 0 & 2.33 \\ 19.055 & 0 & 8.166 & 19.055 & 0 & 8.166 \\ 0 & 224 & 0 & 0 & 224 & 0 \\ 8.166 & 0 & 2.33 & 8.166 & 0 & 4.66 \end{bmatrix} \begin{Bmatrix} U_3 \\ V_3 \\ \theta_3 R \\ U_3' \\ V_3' \\ \theta_3' R \end{Bmatrix}$$

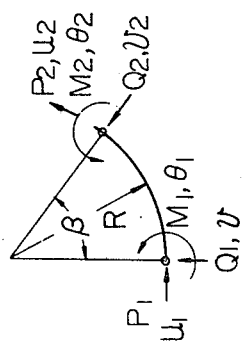

$\beta = \pi/4$, $I = \dfrac{bt^3}{12}$

E : YOUNG'S MODULUS
R : RADIUS
b : BEAM WIDTH
t : BEAM HIGHT

CLOSED RING STRUCTURE OF CONVENTIONAL BLOCK $$v_1 = v_3 = \Delta$$

$$v_2 = -\frac{338.4}{382.45}\Delta = -.8569\Delta$$

$$P_{12} = \frac{EI}{R^3} 82.295 \Delta$$

$$Q_1 = \frac{EI}{R^3} 164.64 \Delta$$

$$M_{12} = \frac{EI}{R^2} 82.28 \Delta$$

$$P_{21} = -116.45 \cdot \frac{EI}{R^3} \Delta$$

$$M_{21} = \frac{EI}{R^2} 11.60 \Delta$$

Jan. 5, 1971 TAKASHI MATSUBAYASHI ET AL 3,552,055
TOY BUILDING BLOCKS
Filed Dec. 11, 1968 6 Sheets-Sheet 5

Fig. 12(b) OPEN STRUCTURE

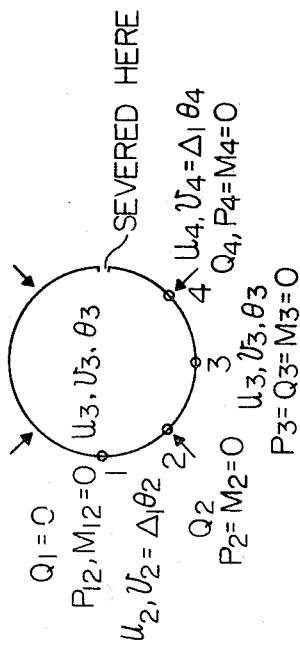

$v_1 = .8729\Delta$, $u_2 = .7220\Delta$, $\theta_2 R = .9702$, $u_3 = 1.574\Delta$, $v_3 = 1.147\Delta$, $\theta_3 R = 1.647\Delta$
$u_4 = 2.447\Delta$, $\theta_4 R = 1.928\Delta$ STRESS $P_{12} = \frac{EI}{R^3} 2.396\Delta$ $M_{12} = \frac{EI}{R^2}(-1.357\Delta)$ $P_{21} = \frac{EI}{R^3}(-1.953\Delta)$
$Q_{21} = \frac{EI}{R^3} 1.433\Delta$ $Q_{23} = \frac{EI}{R^3} 0.027\Delta$ $Q_2 = \frac{EI}{R} 1.460\Delta$ $(Q_2 = Q_{21} + Q_{23})$
$M_{23} = \frac{EI}{R^2}(-0.9518\Delta)$, $P_{32} = \frac{EI}{R^3}(-0.7742\Delta)$, $M_{32} = \frac{EI}{R^2}(0.6897\Delta)$, $Q_4 = \frac{EI}{R^3} 1.084\Delta$ INVENTORS
TAKASHI MATSUBAYASHI
HIROZO MATSUBAYASHI
BY Kurt Kelman
AGENT

United States Patent Office

3,552,055
Patented Jan. 5, 1971

3,552,055
TOY BUILDING BLOCKS
Takashi Matsubayashi and Hirozo Matsubayashi, Habikino-shi, Japan, assignors to Nintendo Playing Card Co., Ltd., Kyoto, Japan, a Japanese body corporate
Filed Dec. 11, 1968, Ser. No. 782,871
Claims priority, application Japan, Dec. 16, 1967, 42/105,450
Int. Cl. A63h 33/10
U.S. Cl. 46—26                    3 Claims

ABSTRACT OF THE DISCLOSURE

A toy building block having a plurality of cylindrical projections formed on one side and an elastic clamping projection on the opposite side thereof. In assembling such blocks said elastic clamping projection of one block engages with the cylindrical projections of another block so as to be combined to form one piece.

BACKGROUND OF THE INVENTION

This invention relates to a toy building blocks and more particularly to the toy building blocks each of which has a plurality of cylindrical projections on one side thereof, an encircling side wall extending from the opposite side at right angles thereto and an elastic clamping projection formed on the latter side and extending in parallel with said side wall, said cylindrical projections adapted to fit into the space defined by the corresponding side wall and elastic clamping projection of another block piece of like design in intimate contact therewith to provide a desired multi-block structure which may be a toy building, a toy automobile or a toy animal, for instance.

DESCRIPTION OF THE PRIOR ART

Heretofore, varieties of toy building blocks have been devised. To them, the mode of assembling is generally common. Thus, a typical building block is a rectangular piece of material which has two rows of main cylindrical projections on one side thereof, a continuous side wall extending from the other side and auxiliary cylindrical projections extending parallel to said side wall from said opposite side. In assembling such block pieces, the peripheral walls of the main cylindrical projections of a block piece are brought into engagement with the inner surface of the side wall and the peripheral walls of auxiliary cylindrical projections of another block piece. In this manner, the structural elasticity that works against the deformation of the side wall and cylindrical projections due to engagement cooperates with the intrinsic elasticity of the material of which the blocks are made to hold the two adjoining blocks in position.

However, the connectional toy block has the disadvantage that owing to the limited structural elasticity, of which a detailed explanation will hereinafter be presented, the projections and wall of the block are susceptible to failure unless the structure is manufactured of a material which possesses an unusually high elasticity and to very exacting tolerances. Therefore, the production of such building blocks is not only costly but also technically highly complicated.

SUMMARY OF THE INVENTION

With the foregoing disadvantages of the conventional toy block it is therefore an object of this invention to provide improved toy building blocks which are free from foregoing drawbacks.

Another object is to provide toy blocks which can be manufactured to considerably less critical tolerances.

Still another object is to provide toy building blocks which have such a high structural elasticity as to permit assembling with a greater fitting force even when said blocks are made of a synethetic resin material fairly low in elasticity.

Yet another object is to provide toy building blocks which can be produced at low cost, due in a large measure to reduced material and mould costs.

Another object is to provide a toy building block which is provided with an elastic clamping projection which is easily moldable and resists chipping and breaking.

Still other objects and advantages of this invention will become apparent from the following detailed description, taken together with the accompanying drawings.

This invention provides a toy building block having the structure of an elastic clamping projection which possesses an unusually high structural elasticity as will hereinafter be described and explained.

The present invention provides a building block toy which comprises a plurality of rectangular blocks each of which has two rows of cylindrical projections on one side thereof, an encircling side wall extending from the other side at right angles thereto and a clamping projection formed on said other side and extending in parallel with said side wall, said cylindrical projections adapted to fit into the space defined by said side wall and clamping projection of another block of like design in intimate contact therewith to provide an integral multi-block structure, each of said clamping projections being an arcuate wall member, with the arc opening in alternating directions with respect to the longitudinal axis of the block.

The present invention provides a building block toy, in which any two adjacent units of said arcuate wall members are interconnected by a straight wall member at the ends of the arcs and on the centerline of the block to present a continuous undulated wall structure.

The present invention further provides a building block toy, in which each of the arcuate wall members at the ends of said continuous undulated wall structure is a quadrant-free circle, in cross section, the quadrant being located in the general direction specified.

BRIEF DESCRIPTION OF THE DRAWINGS

FIG. 3 is a diagrammatic sketch showing the manner of engagement of the projections and side wall in the conventional block structure;

FIG. 4 is a view showing the bottom side of a building block of this invention;

FIG. 5 is a perspective view, on exaggerated scale, showing the elastic clamping projection of the embodiment illustrated in FIG. 6;

FIG. 6-1 is a diagrammatic plan view of a ring; FIG. 6-2 is a sectional view taken along the line A—A of FIG. 6-1; FIG. 6-3 is a diagrammatic view showing a closed ring structure; FIG. 6-4 is a diagrammatic view showing an open ring structure;

FIG. 7-1 is a diagrammatic view showing a hollow cylinder and a rigid plate fixedly mounted thereon; FIG. 7-2 is a diagrammatic perspective view of the same hollow cylinder as above; FIG. 7-3 is a diagrammatic perspective view of a hollow cylinder with its peripheral wall being partially severed;

FIGS. 11–a, b show the rigidity matrices of arcuate and straight beams, respectively;

FIG. 12–b shows the corresponding stress and deformation that would be encountered if the auxiliary projection of the conventional building block were severed as indicated.

DESCRIPTION OF THE PREFERRED EMBODIMENTS

Figures 1, 6:
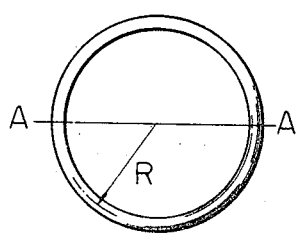
Figures 3, 6:
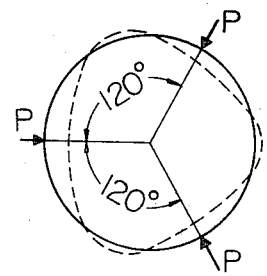
Figures 4, 6:
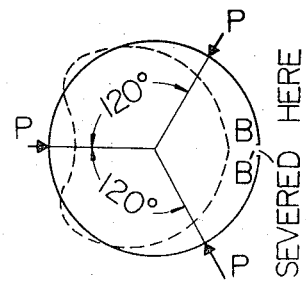
Figures 2, 6:

Referring to FIGS. 1 to 3, the conventional building block is a rectangular piece of material which, as hereinbefore briefly described, has two rows of main cylindrical projections 1 on one side thereof at right angles thereto, a continuous side wall 2 projecting from the other side at right angles thereto and auxiliary cylindrical projections 3 extending from said other side in parallel with said side wall. As aforesaid, in assembling such block pieces, the peripheral walls of the main cylindrical projections 1 of a block piece are engaged with the side wall 2 and the peripheral wall of auxiliary cylindrical projections 3 of another block piece. Toy building blocks of the described type are such that each auxiliary projection is a cylinder formed separately from the side wall 2. In assembling, as the auxiliary cylindrical projection 3 is subjected to the four separate forces applied by the main cylindrical projections 1 as indicated in FIG. 3, the auxiliary projection 3 has only a limited freedom of deformation toward its axis. It follows, then, that unless the block structures are very accurately dimensioned, the assembling of the blocks is made unfeasible or the side wall or/ and projections are broken.

It is for this reason that toy building blocks of the described type must be made of materials which have high intrinsic elasticity, such as ABS resin, and that high precision metal moulds must be employed so as to adhere to very critical dimensional tolerances. It will be obvious that such a practice has the disadvantage of comparatively high production cost.

Referring to FIG. 4, which shows a preferred embodiment of this invention, the building block has an elastic continuous clamping projection 3, in place of the auxiliary cylindrical projections of the conventional block, which constitutes a perpendicular wall structure extending downward through the recess 5 defined by side wall 2 and base wall 4. In this arrangement, when the block piece is assembled with another block piece or like design, the upper portion of the peripheral wall of the elastic clamping projection 3 is engaged by the peripheral walls of the adjacent main cylindrical projections on acruate members 11, 12, 13 of the perpendicular wall structure 3, with the center of each arc being disposed so that the main cylindrical projections of the second block piece will be located on an imaginary concentric circle drawn about said center. The arcuate members 11, 12 and 13 are interconnected by connecting wall members 14 and 15 which are straight as shown. The arcuate members 11 and 13 respectively may be visualized, in section taken on a place parallel to the base, as a circle from which a sector has been severed off, and the severed-off sectoral areas 16, 17 of the circles 11, 13 are oriented generally in the same general direction with respect to the longitudinal axis of the block as shown. The arcuate member 12 of the elastic clamping projection 3 is located between said arcuate members 11 and 13, and is substantially a semicircle, in cross-section along a plane parallel to the base, with its severed-off area or opening being oriented in a generally opposite direction from the severed-off sections 16, 17 of the arcuate members 11, 13 with respect to the longitudinal axis of the block. The connecting wall members 14, 15 are located on the longitudinal central axis of the block, interconnecting the arcuate wall members 11 and 12 and 12 and 13 at the respective ends. In another embodiment of this invention, the arcuate members 11, 12, 13 are not formed one-piece with the body of the block but constitute independent units separate from each other and the connecting wall members 14, 15 are dispensed with.

When any two pieces of the block described above are assembled, the elastic clamping projection 3 of a block piece on contact with the main cylindrical projections 1 of another block piece yields a structural elasticity which cooperates with the intrinsic elasticity of the block to absorb any excess fitting force. The dynamics of the block of this invention and the consequent advantages of the block structure over the conventional block will be explained below in further detail.

Let it now be assumed that a cylinder is truncated along a plane parallel to the base. Whereas the auxiliary projection of the conventional building block presents a totally closed annular cross-section, the cross-section of the elastic clamping projection of the present invention (an embodiment) is an open structure consisting of arcuate members and straight members. Dynamically, there are substantial differences between the closed and open structures. Those differences will be shown and accounted for in detail.

FIG. 6–1 is shown a ring, and FIG. 6–2 shows the cross-section taken along line A—A of FIG. 6–1. FIG. 6–3 shows a closed ring structure, while FIG. 6–4 shows a ring which is severed (an open ring structure). Under the forces working as indicated, both structures are respectively in equilibrium. The deformations will be as indicated by dotted lines. As the open structure is a ring severed at B, B', the tangent of the ring member at B, B' does not coincide with the expansion-construction after deformation.

In the closed structure (FIG. 6–3), there are restricting forcse (axial force and bending moment) working so that, at B, B', the expansion-construction coincides with the tangential line of the ring member.

Let it be assumed that a rigid plate (deformation-resistant) is mounted fixedly on top of the cylindrical projection extending at right angles to the bottom (see FIG. 7–1) and that a horizontal force is applied to the plate. Now if the horizontal displacement of the plate is calculated, there also is noted a difference between the closed and open structures. If the height ($h$) of the projection is equal to or greater than the radius ($R$) and the shear deformation is disregarded, the ratio of the displacement ($W$) of the cylinder top in the direction of the force applied in the closed structure (FIG. 7–2) to the corresponding displacement in the open structure (FIG. 7–3) will be as follows:

$$\frac{2}{\pi}\left(\frac{1}{2}\theta_0 + \frac{1}{4}\sin 2\theta_0 - \frac{\sin 2\theta_0}{\theta_0}\right)$$

Figures 1, 7:
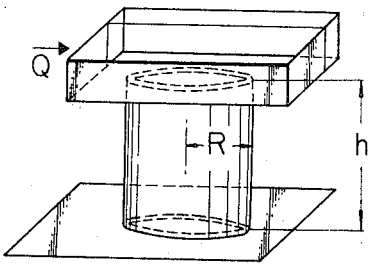
Figures 2, 7:
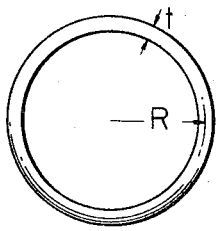
Figures 3, 7:
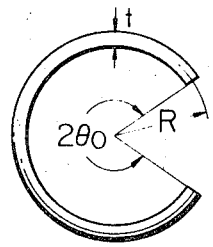

$\theta_0 = \pi/2; 0.106:1$ $\theta_0 = 3\pi/4; 0.5623:1$ (see FIGS. 7–2 and 7–3)

The open structure undergoes a larger deformation or is deformed by a smaller force.

Figures 1, 8:
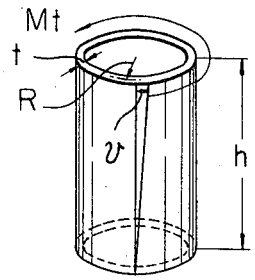
FIG. 1 is a perspective view showing the bottom side, in particular, of a connectional building block.
FIG. 8 is a perspective diagrammatic view showing the states of a hollow cylinder with a partially severed wall as it is twisted.
Figures 2, 8:
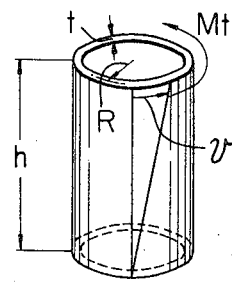
FIG. 2 is a plan view showing the bottom side of the conventional building block.

A significant difference is also noted between the closed and open structures when hollow cylinders are twisted. Assuming that two hollow cylinders are equal in radius, wall thickness and height, with the torsional moment being constant. It is further assumed that the circumferential displacement of the closed cylinder is $V$ and the displacement of the open cylinder $V'$. Then, $V:V' = 1:3R^2/t^2$. If $R = 10t$, $V:V' = 1:300$. (See FIG. 8.)

Figure 9:
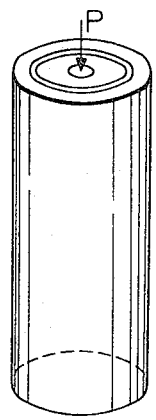
FIG. 9 is a schematic perspective diagram illustrating a cylinder.

While Saint Venant's law remains yet to be well established, it is known to hold true in actual calculations and is widely utilized. If this law is applied to a cylinder subject to a compressive force, the following observation can be made. (See FIG. 9.) Whether the force P is working only at the center of the cylinder top or the total load P is evenly distributed on a concentric circle, there is a mean stress equivalent to P divided by the total cross sectional area of the cylinder at a level a certain distance below the cylinder top.

Figure 10:
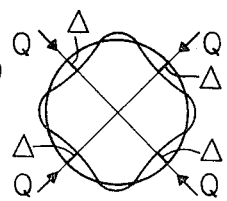
FIG. 10 is a diagrammatic view showing the auxiliary projection of the conventional toy building block as it is engaged by the main cylindrical projections.

Regarding the conventional building block, let it be assumed that the four main cylindrical projections are engaged by the auxiliary cylindrical projection in such a manner that each of the main projections is forced by distance $\Delta$ into the auxiliary projection toward the axis of the latter. The arrangement of the main projections being symmetrical, let it be assumed that the force applied by every one of the main projections to the auxiliary projection is Q (see FIG. 10).

The four loads (each of which is equal to Q in the axial direction) working on the auxiliary projection are in equilibrium. Therefore, according to Saint Venant's law, both the stress and deformation approximate 0, on a plane a certain distance below the level of contact. In other words, the stress and deformation by said contact takes place only in the neighborhood of contact level. While the projections are engaged in plane contact, it can be approximately regarded as a line contact. In so doing, the analysis involved will be that of a ring having the radius (R), width ($b$) and thickness ($t$).

Figure 12A:
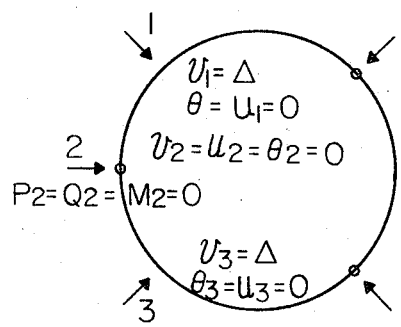
FIG. 12–a shows the stress and deformation encountered in the conventional building block when an axial displacement equal to Δ is applied to the auxiliary projection by the four adjacent main projections.
Figure 13:
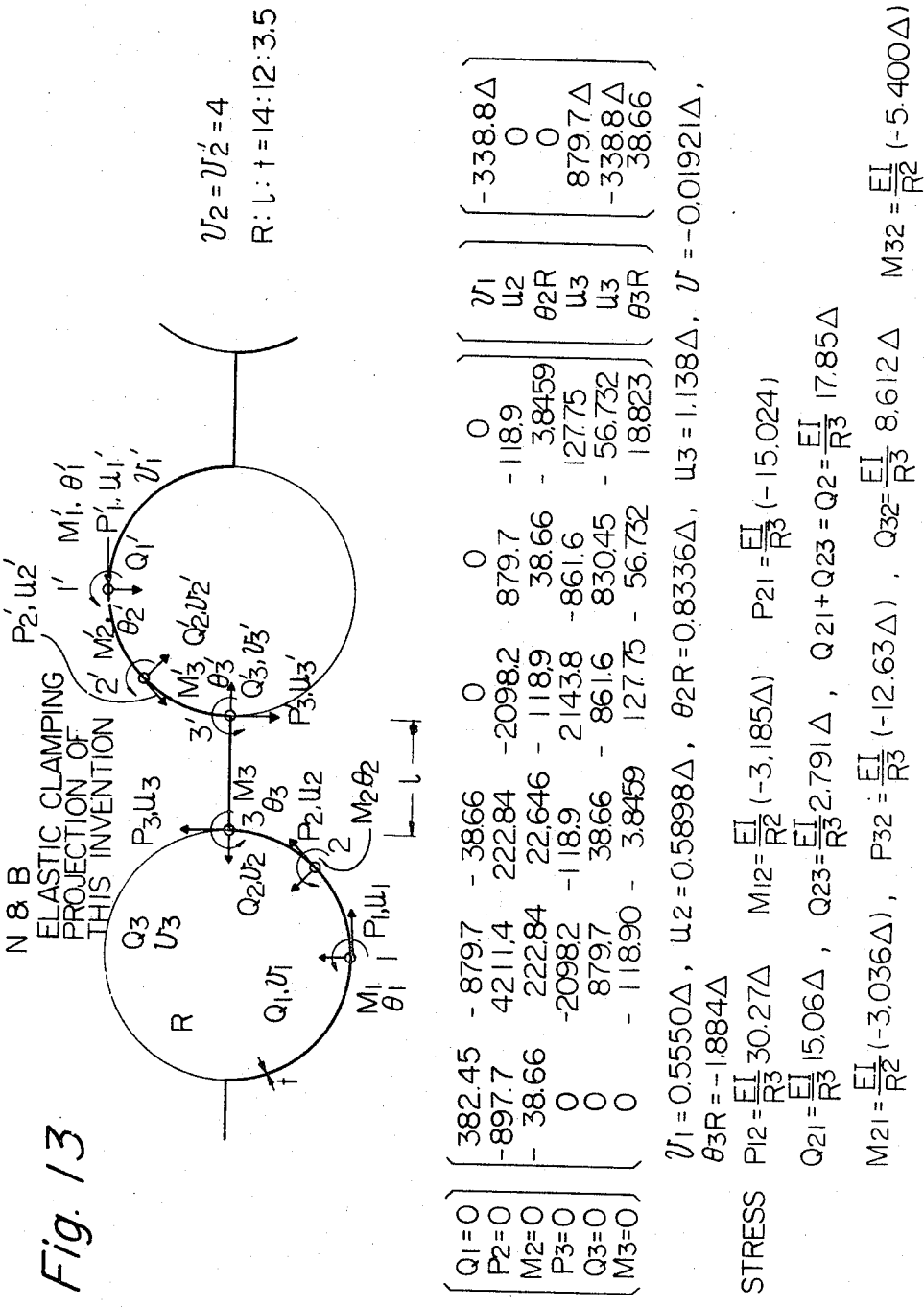
FIG. 13 shows the stress and deformation encountered in the building block of this inevntion when there is an axial displacement of Δ.

FIGS. 11–$a,b$ show the rigidity matrices of arcuate and straight beams, respectively. FIG. 12–$a$ show the stress and deformation encountered when an axial displacement equal to $\Delta$ is applied to the auxiliary projection by the four adjacent main projections of the conventional block structure. FIG. 12–$b$ shows the corresponding stress and deformation that would be encountered if the auxiliary projection were severed as indicated. FIG. 13 shows the stress and deformation encountered in the building block of this structure when there is an axial displacement of $\Delta$. Assuming that the stress (generated in elastic clamping projection) and reaction (main projection) are unity, the stress and reaction in the building block of this invention are approximated as follows:

$Q$ invention/$Q$ conventional=0.11
$M$ invention/$M$ conventional=0.07
$P$ invention/$P$ conventional=0.26

It is therefore clear that by adopting the open structure of this invention, the maximum stress can be reduced to at least about one fourth of the stress encountered in the conventional block structure. Therefore, if the two different blocks are made of the same material, the production precision may be lowered as much. Alternatively, lower quality materials can be utilized in the production of the building blocks of this invention.

While the particular toy building block herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. A building block toy which comprises a plurality of rectangular blocks each of which has two rows of cylindrical projections on one side thereof, an encircling side wall extending from the other side at right angles thereto and a clamping projection formed on said other side and extending in parallel with said side wall, said cylindrical projections adapted to fit into the space defined by said side wall and clamping projection of another block of like design in intimate contact therewith to provide an integral multi-block structure, each of said clamping projections being an arcuate wall member, with the arc opening in alternating directions with respect to the longitudinal axis of the block.

2. A block toy claimed in claim 1, wherein any two adjacent units of said arcuate wall members are interconnected by a straight wall member at the ends of the arcs and on the centerline of the block to present a continuous undulated wall structure.

3. A toy building block claimed in claim 2, wherein each of the arcuate wall members at the ends of said continuous undulated wall structure is a quadrant-free circle, in cross section, the quadrant being located in the general direction specified.

References Cited

UNITED STATES PATENTS

| 3,005,282 | 10/1961 | Christiansen | 46—25 |
| 3,310,906 | 3/1967 | Glukes | 46—26X |
| 3,438,544 | 4/1969 | Lloyd | 220—97 |

LOUIS G. MANCENE, Primary Examiner

D. L. WEINHOLD, JR., Assistant Examiner